June 9, 1925.
J. H. HUNT
ENGINE CONTROL
Filed March 27, 1919
1,541,052
2 Sheets-Sheet 1
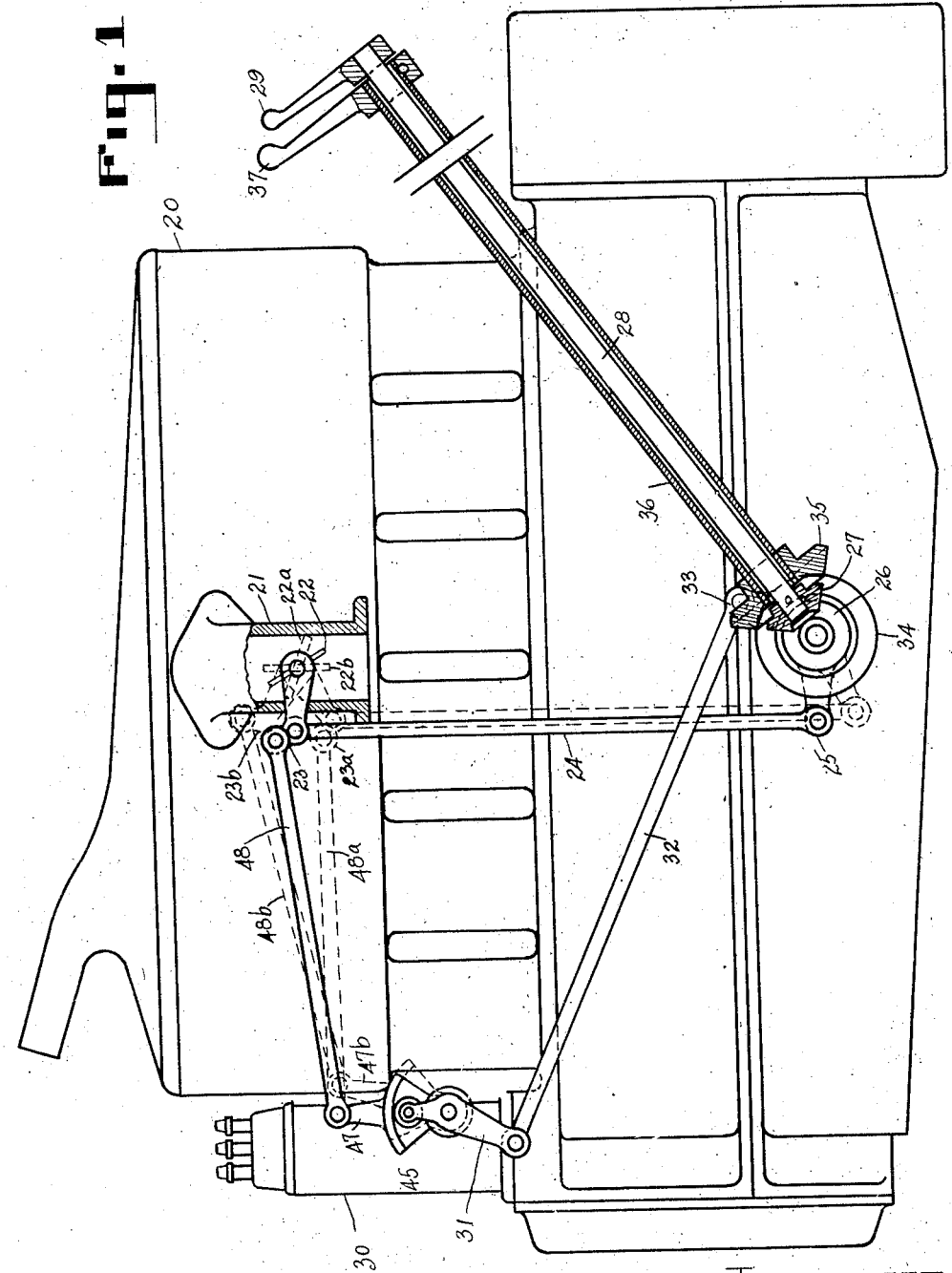

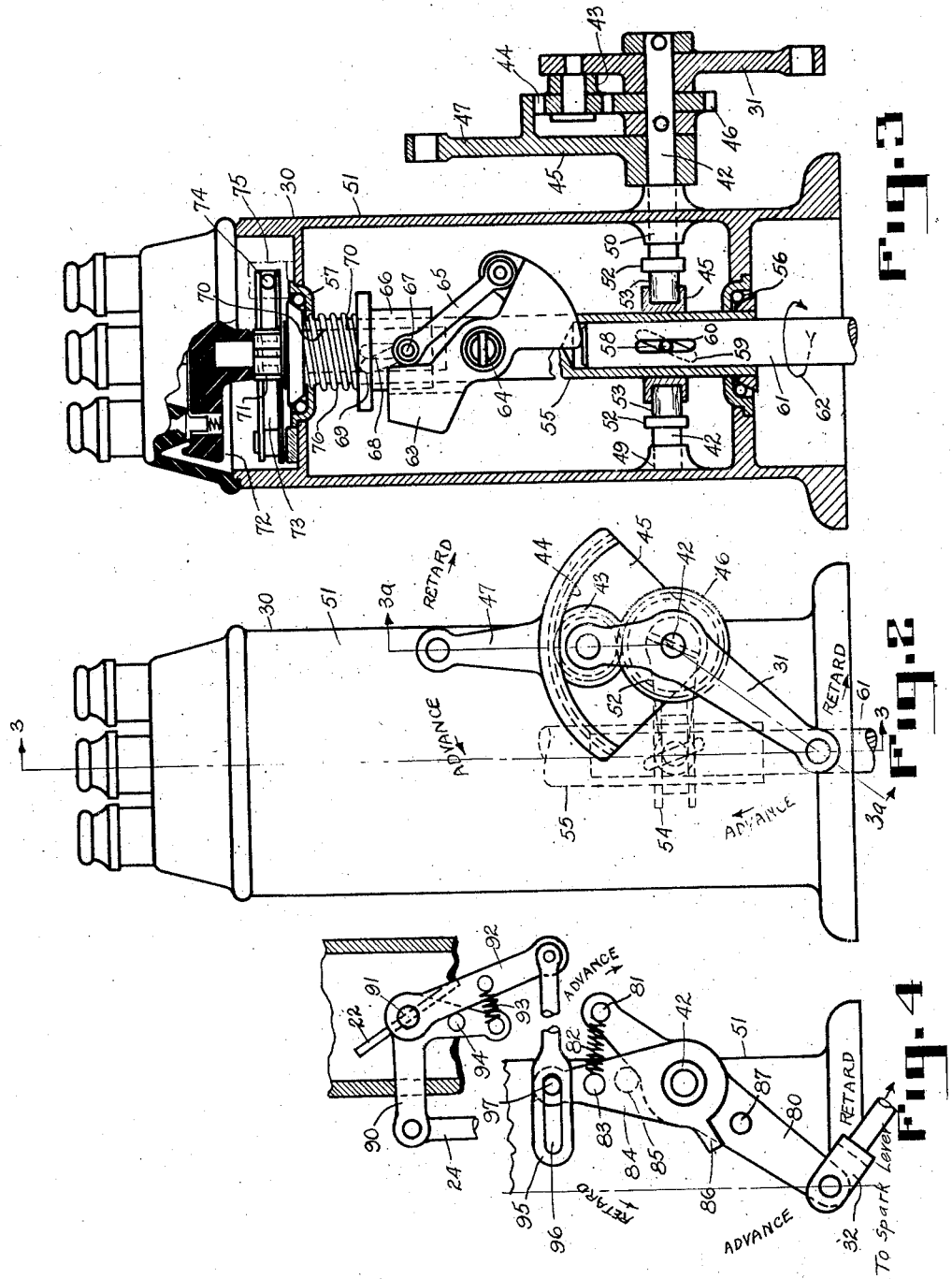

Patented June 9, 1925.

1,541,052

UNITED STATES PATENT OFFICE.

JOHN H. HUNT, OF DAYTON, OHIO, ASSIGNOR TO THE DAYTON ENGINEERING LABORATORIES COMPANY, A CORPORATION OF OHIO.

ENGINE CONTROL.

Application filed March 27, 1919. Serial No. 285,660.

*To all whom it may concern:*

Be it known that I, JOHN H. HUNT, a citizen of the United States of America, residing at Dayton, county of Montgomery, State of Ohio, have invented certain new and useful Improvements in Engine Controls, of which the following is a full, clear, and exact description.

This invention relates to internal-combustion or explosion engines, and one object of the invention is to control the timing of the ignition for the engine in such a manner as to secure the maximum efficiency while preventing injurious operation of the engine.

In carrying out this invention, I have found that better fuel economy can be obtained where the spark is advanced when the engine is running at moderate speeds and with a comparatively light load, to a greater degree of advance than could be maintained without the engine knocking when carrying a comparatively heavy load. I have found that within a certain range of variations of engine load, the spark may be advanced or retarded in accordance with speed variations without regard to load variations, but that above a certain load depending on the type of engine the spark must be retarded to secure satisfactory engine performance. One manner of accomplishing the object is to control the timer manually in order that the timing can be set to give the best engine performance at comparatively light loads and moderate speeds; to control the timer in accordance with the speed of the engine; and to combine with the manual and speed control other means for controlling the ignition timing in accordance with the position of the throttle, so that above a certain engine load the spark will be retarded.

Other and further objects and advantages of the present invention will be apparent from the following description, reference being had to the accompanying drawings, wherein preferred embodiments of the present invention are clearly shown.

In the drawings:

Fig. 1 is a side elevation of an internal-combustion engine to which the present invention is applied, certain parts being shown in section;

Fig. 2 is a side elevation of an ignition unit showing certain of the controlling devices therefor;

Fig. 3 is a longitudinal sectional view of the ignition unit shown in Fig. 2 taken on the line 3—3 together with a sectional view of certain of the controlling devices shown in Fig. 2, said later sectional view being taken on the line 3ª—3ª of Fig. 2; and Fig. 4 is a fragmentary view showing a modified form of the ignition controlling devices.

In the drawings, an internal-combustion engine 20 is provided with an intake manifold 21 in which is located a throttle valve 22 operated by valve lever 23. Lever 23 is connected by link 24 with arm 25 connected with a bevel gear 26 which meshes with a bevel gear 27 at right angles thereto. Gear 27 is mounted on a shaft 28 which carries at its upper end a throttle lever 29.

An ignition unit 30 is mounted upon the engine 20 and is mechanically connected with the crank shaft of the engine in a well-known manner by gearing not shown. Ignition unit 30 is manually controlled by means of a lever 31 which is connected by link 32 with an arm 33 which is carried by bevel gear 34. Gear 34 meshes with gear 35 which is fixed upon the lower end of a tube 36 which carries at its upper end the spark lever 37. Shaft 28 and tube 36 and the gearing connected therewith may be journalled within the steering post of the motor vehicle, upon which the engine 20 is mounted.

Referring particularly to Figs. 2 and 3, lever 31 is loosely journalled upon a shaft 42 and carries a pivotally mounted pinion 43 which meshes with internal gear 44 carried by a sector plate 45 which is loosely journalled upon shaft 42. Pinion 43 engages also a gear 46 which is fixed upon the shaft 42. Segment 45 is provided with an arm 47 which is connected by link 48 with throttle valve lever 23.

Shaft 42 is journalled in bearings 49 and 50 carried by the timer housing 51, and supports within said housing a forked lever 52. Lever 52 carries studs 53, 53 which engage with a grooved collar 54 slidably mounted upon a shaft 55. Shaft 55 is journalled in bearings 56 and 57 carried by timer housing 51. Collar 54 carries a pin 58 passing diametrically across the central aperture thereof and through spiral slots formed in shaft 55, one of which is shown at 59, and through a straight slot 60 formed in the driving shaft 61. Shaft 61 is connected by means of any suitable gearing with the crank shaft of the engine, not shown, so as to be rotated in the direction indicated by the arrow 62.

Shaft 55 supports a centrifugal element 63 pivotally mounted at 64 and connected by means of link 65 with sleeve 66. Sleeve 66 carries a pin 67 passing diametrically across the central aperture thereof and through a straight slot 68 formed in shaft 55 and through a spiral slot 69 formed in shaft 70 which supports the timer cam 71 and a distributor rotor 72. Cam 71 cooperates with breaker arm 73 to separate the timer contacts in the well known manner, the movable timer contact 74 being supported upon breaker arm 73 and the stationary timer contact being supported upon a bracket 75. A spring 76 is interposed between the sleeve 66 and the bearing 57 for the purpose of resisting the action of centrifugal force upon the weight member 63.

It is evident from the foregoing description that the timer of the ignition will be advanced with increasing speed, for the reason that as the centrifugal member tends to assume a horizontal position sleeve 66 will move upwardly carrying pin 67 with it, which through the connections with slots 68 and 69 will advance the cam shaft 70 in the direction of the arrow 62. In a similar manner upward movement of the collar 54 will effect the advance of ignition for the reason that as pin 58 is moved upwardly, shaft 55 will be advanced relatively to shaft 61 in the direction of the arrow 62.

This movement of the collar 54 is effected by rotating the shaft 42, which in turn is arranged to be rotated manually either directly by means of the spark lever 37 or indirectly through the throttle control lever 29. Assuming that throttle lever 29 is stationary, the arm 47 and sector plate carrying internal gear 34 will be maintained stationary. Whenever spark lever 37 is moved to advance the spark the arm 31 will be moved clockwise as indicated in Fig. 2 thereby effecting counter clockwise rotation of gear 43 about its own axis and the clockwise orbital rotation of the axis of gear 43 about shaft 42. This motion will impart clockwise motion to gear 46 causing sleeve 54 to move upwardly to advance the spark.

Assuming that the spark lever 37 is held stationary when the throttle lever 29 is moved towards open position, the valve lever 23 and valve 22 will be moved in a clockwise direction. The idling position of valve 22 and lever 23 is indicated at 22$^a$ and 23$^a$ respectively. An intermediate position of these members is indicated by the full lines. When the valve 22 is wide open and will occupy the position 22$^b$, the valve lever will occupy the position 23$^b$. The idling position of link 48 is shown at 48$^a$, the position corresponding to full open valve position is shown at 48$^b$. It will be noted that as the valve opens from idling position 22$^a$ to an intermediate position 22, the arm 47 will receive very little motion on account of the relation of link 48 to arm 23. But as the valve opens still further from intermediate position 22 to position 22$^b$ a substantial motion will be imparted to the lever 47 causing it to take the position 47$^b$. This clockwise movement of lever 47 will effect the retard of the spark in the following manner. Lever 31 and the pivot of gear 43 being stationary, as internal gear is rotated clockwise, gear 43 will be rotated also clockwise causing gear 46 to be rotated counter clockwise with a result that sleeve 44 is moved downwardly to retard the spark.

It is apparent therefore that no substantial retarding of the spark takes place immediately upon the movement of the throttle valve from idling towards open position, but that a substantial movement begins to take place after the valve has opened to predetermined position. I have found that within certain limits of load carried by the engine, there is no necessity for retarding the spark as the throttle is opened but that the ignition can be controlled satisfactorily by the hand and speed control. In some types of engines, for example, the engine may carry three quarters load without knocking with the same degree of spark advance that is desirable for lighter loads to give the best fuel economy. However, above three quarters torque for this type of engine it has been found necessary to retard the spark somewhat to avoid the knock when the throttle is opened still further. It is to be understood, however, that three quarters torque is not the load carried by all types of internal-combustion engines at which ignition knocking begins to occur, but that this load will vary for different types of engines. It will be understood therefore that at some predetermined position of the throttle between idling and full open position that it is necessary to retard the spark somewhat in order to prevent knocking. In Fig. 1 this predetermined position of the throttle is indicated in the full lines at 22.

In order to secure the best engine performance and fuel economy all that is necessary is to set the spark lever 37 at the position which will give the best engine performance for light loads at moderate speeds, allowing the automatic timer control advance or retard the spark in accordance with variations in speed of the engine. No further adjustment of the spark lever is necessary, since the advance determined by the manual and automatic speed control of the timer will give satisfactory engine performance and fuel economy up to a certain load carried by the engine. When this predetermined load is exceeded, further opening of the throttle to take care of this load will effect the retarding of the spark the correct amount in the manner described.

A modified form of the invention is shown in Fig. 4. Lever 80 is loosely journalled upon the shaft 42; is connected at one end by link 32 with the arm 33, shown in Fig. 1, and carries at its other end a stud 81 which is connected by spring 82 with a stud 83 carried by arm 84 which is mounted in fixed relation with shaft 42. The spring 82 normally maintains a stud 85 carried by arm 84 in contact with the arm 80 and thereby limits the angular relation of arms 80 and 84 in one direction. The relation of these arms in another direction is limited by a stop lug 86 carried by arm 84 which is arranged to engage with a stud 87 carried by the lever 80. The link 24 connects the throttle lever 29 with a lever 90 which is mounted in fixed relation with a throttle valve shaft 91 which supports the throttle valve 22. An arm 92 is loosely journalled upon the shaft 91 and connected with lever 90 by means of a spring 93. A stud 94 carried by lever 90 is normally held in engagement with lever 92 by means of spring 93, and serves to limit the angular relation between levers 90 and 92 in one direction. Lever 92 is connected with a link 95 which is provided with a slot 96 into which projects a pin 97 carried by lever 84.

The operation of the form of the invention shown in Fig. 4 is as follows:

Let it be assumed that the engine is carrying a load beyond which it is necessary to retard the spark in order to prevent ignition knocking. The throttle valve position corresponding to this load is at 22 in Fig. 4. This throttle position corresponds to the intermediate throttle position 22 shown in Fig. 1. By reason of the pin and slot connection between link 95 and lever 84 manual control of the spark by means of the spark lever 37 is permitted. The valve 22 can be moved from idling position to the position shown in Fig. 4 without affecting the timer control. Fig. 4 shows the relation of the timing controlling elements, when the spark has been advanced manually, as far as is consistent with the operation of the engine without knocking. Further movement of the spark lever toward the spark advancing position will cause the lever 84 to shift link 95 toward the right as viewed in Fig. 4 and impart counter clockwise movement of the lever 92 relatively to the lever 90. This movement will increase the tension in spring 93 which is of sufficient strength that an appreciable increase of force will need to be employed to the spark lever 37 in order to elongate this spring. This substantial increase in force will indicate to the operator that the timing has been advanced too far by the spark lever. If the load on the engine is increased still further and throttle valve 22 is opened still wider to meet this demand for increased power, motion will be imparted to lever 92 from lever 90 through the spring 93 causing link 95 to move to the left and to engage pin 97 and to move lever 84 towards spark retarding position. Spring 93 is made sufficiently stronger than spring 82 so that angular displacement of levers 84 and 80 can take place without angular displacement of levers 90 and 92. This movement of lever 84 may continue until the stop lug 86 engages the stud 87 carried by lever 80 whereupon further movement in the same direction of lever 84, link 95 and lever 92 is prevented. Then, by reason of the spring driving connection between levers 90 and 92, further clockwise movement of lever 90 may continue without retarding the spark further than the predetermined amount. As the load on the engine is decreased and throttle 22 is moved towards closed position, the spark will be advanced automatically since the spring 82 will restore the normal angular relation between levers 80 and 84.

The form of the invention shown in Fig. 4 can be used advantageously where it is not practical to require a close adjustment of the throttle valve lever relatively to the timer controlling mechanism or where the throw of the throttle lever from the predetermined open position to full open position is greater than that required to retard the spark to meet the load conditions. The form of the invention provides a limit to the throttle control of the spark retard while allowing the throttle valve to be opened as wide as desired. This form can be advantageously used where on account of the nature of the engine to be controlled it is desirable to effect a retard during only a part of the movement of the throttle valve from the predetermined open position to full open position, permitting further movement to full open position without further spark retard.

While the forms of mechanisms herein shown and described constitute preferred forms of embodiments of the invention, it is to be understood that other forms might be adopted, all coming within the scope of the claims which follow:

1. In a control system for internal-combustion engines, the combination with an engine having a throttle valve; of an ignition unit having a movable spark controlling shaft; a throttle control lever; a spark control lever; a lever loosely mounted on said shaft and carrying a pinion; a gear fixed to said shaft and engaging said pinion; a second gear loosely mounted on said shaft and engaging said pinion; means connecting said second gear with said throttle control lever; and means connecting said third mentioned lever with said spark control lever.

2. In a control system for internal-combustion engines, the combination with an engine having a throttle valve and a throttle lever for controlling the same; of an ignition unit having a movable controlling member; a gear for operating said member; a second gear; an intermediate pinion connecting said gears; a spark controlling lever; means for connecting the second gear with one of said levers; and means for connecting the pinion with the other of said levers for bodily movement of said pinion.

3. In a control system for internal combustion engines, the combination with an engine having a throttle valve and throttle lever for controlling the same; of an ignition unit having a movable controlling member; a spark control lever; means connected with one of said levers and with said member, including a rotatable member; and means connecting said rotatable member with the other of said levers for producing translatory movement of the axis of said member to vary the timing of the ignition unit.

4. In a control system for an internal combustion engine having a throttle valve and an ignition timer, in combination, three individual systems for controlling said timer which are cumulatively operable to advance or retard said timer, including first, an engine speed controlled system, second, a system controlled by the throttle valve position, and third, a manually controlled system.

5. In a control system for an internal combustion engine having a throttle valve and an ignition timer, in combination, three individual systems for controlling said timer which are simultaneously and cumulatively operable to advance or retard said timer, including first, an engine speed controlled system, second, a system controlled by the throttle valve position, and third, a manually controlled system, the normal operation of the second system being unchanged by a change of setting of the third system.

In testimony whereof I affix my signature.

JOHN H. HUNT.

Witnesses:
 HAZEL SOLLENBERGER,
 J. W. McDONALD.